(12) United States Patent
Grimes et al.

(10) Patent No.: US 6,828,536 B1
(45) Date of Patent: Dec. 7, 2004

(54) WELDING APPARATUS

(75) Inventors: Ryan Grimes, Southampton (GB); Mark William Russell, Lovedean (GB); Richard Gerald Charles MacDonald, Tamworth (GB)

(73) Assignee: Stanelco RF Technologies Limited, Southampton (GB)

( * ) Notice: Subject to any disclaimer, the term of this patent is extended or adjusted under 35 U.S.C. 154(b) by 0 days.

(21) Appl. No.: 10/403,281

(22) Filed: Apr. 1, 2003

(30) Foreign Application Priority Data

Apr. 13, 2002 (GB) .............................. 02 08581

(51) Int. Cl.⁷ ................................. H05B 6/54
(52) U.S. Cl. ...................... 219/765; 219/727
(58) Field of Search ................. 219/765, 764, 219/777, 607, 635, 643, 780, 769, 775, 660, 243; 156/268, 380.6, 380.4, 380.1, 358, 367

(56) References Cited

U.S. PATENT DOCUMENTS 3,992,606 A * 11/1976 Arutt et al. ................. 219/243
4,013,860 A * 3/1977 Hosterman et al. .......... 219/769
4,496,819 A * 1/1985 Acker et al. ................. 219/769
5,427,645 A * 6/1995 Lovin .......................... 156/367
5,750,971 A   5/1998 Taylor ......................... 219/769

FOREIGN PATENT DOCUMENTS

GB      744217      2/1956
GB     1048491     11/1966

* cited by examiner

Primary Examiner—Quang T. Van
(74) Attorney, Agent, or Firm—William H. Holt

(57) ABSTRACT

A dielectric welding apparatus for welding a plastic sleeve contains a solid state radio frequency generator linked via a matching network to a welding tool. The tool (30) includes a frame (35) with a handle (36), the frame defining a slot in which are opposed welding electrodes (40, 44), the slot being open at one end and at the other end communicating with a wider aperture (39). A pneumatic cylinder (48) can be actuated to urge the electrodes together, both the cylinder (48) and the RF generator (66) being activated by a trigger (50) on the tool (30). The electrodes are coated with an electrically insulating material that is not dielectrically heated, and are readily removable, so they can be replaced, for example when the electrically insulating coating becomes worn.

8 Claims, 3 Drawing Sheets

WELDING APPARATUS

This invention relates to an apparatus for welding together sheets of plastic, particularly but not exclusively for welding and sealing plastic bags containing waste or hazardous material.

When processing or handling small quantities of radioactive material it is known to use a glove box, the glove box shielding the operator from the radiation, and incorporating gloves mounted in ports in the wall of the box so the operator can manipulate objects within the box. Objects may be transferred out of the box through a port into a plastic tube or sleeve, and the plastic sleeve then sealed to form a bag enclosing the objects. Hence objects can be removed while remaining sealed from the environment. A similar procedure may be used when removing objects from a hot cell in which they are handled by a manipulator. The use of dielectric welding (which may also be referred to as radio frequency heating or high frequency heating) for welding such a plastic tube or bag has been known for many years. In this process the two films of thermoplastic material (such as polyvinyl chloride) are positioned between opposed electrodes (or one electrode and a base plate), the electrodes are pressed together, and a radio frequency voltage is applied between the electrodes. This process is applicable to materials which have a significant dielectric loss index, for example greater than 0.2, at the radio frequency. This may be between 1 MHz and 200 MHz, usually between 10 MHz and 100 MHz, although in practice it may be constrained by regulations, for example to be either 27.12 MHz or 40.68 MHz. However, such tools as used hitherto are no longer acceptable because the operating frequency varies with the electrical load during the welding process, and so the tool transmits radio waves into the surroundings at frequencies other than those permitted for dielectric welding.

According to the present invention there is provided a dielectric welding apparatus for welding a plastic sleeve, the apparatus comprising a solid state radio frequency generator, a matching network, and a welding tool, the tool comprising a frame with a handle, the frame defining a slot in which are opposed welding electrodes, the slot being open at one end and at the other end communicating with a wider aperture, and means for urging the electrodes together, the welding electrodes being connected via the matching network to the generator.

Preferably the electrodes are coated with an electrically insulating material that is not dielectrically heated, for example PFA (perfluoro alkoxyalkane). Preferably the electrodes are readily removable, so they can be replaced; this may be because the electrically insulating coating becomes worn, or alternatively the electrodes might be replaced by electrodes of a different shape, though preferably of the same area.

Preferably the radio frequency generator and the matching network are in a cabinet, and the welding tool is connected to the cabinet by a coaxial cable. The cable is preferably of a length that is a whole number of quarter wavelengths of electromagnetic radiation along the cable at the operating frequency. The means for urging the electrodes together may for example be a pneumatic cylinder, and may be under trigger control. The coaxial cable is preferably linked to the cable or tube carrying the power for urging the electrodes together, for example the pneumatic tube if a pneumatic cylinder is involved, and both the coaxial cable and the power supply cable or tube are fed into the frame of the tool opposite the end at which the slot is open. This helps balance the tool during use.

In the preferred embodiment the electrodes are urged together by a pneumatically actuated mechanism, and the cabinet incorporates a compressor and a reservoir for compressed air. The compressor is arranged to switch on if the pressure is below a lower operating limit, and to switch off when the pressure reaches an upper operating limit. However, if the pressure drops to below a threshold (below the lower operating limit) this indicates a significant leak in the pneumatic system, and the compressor is switched off.

The invention will now be further and more particularly described, by way of example only, and with reference to the accompanying drawings, in which.

Figure 1:
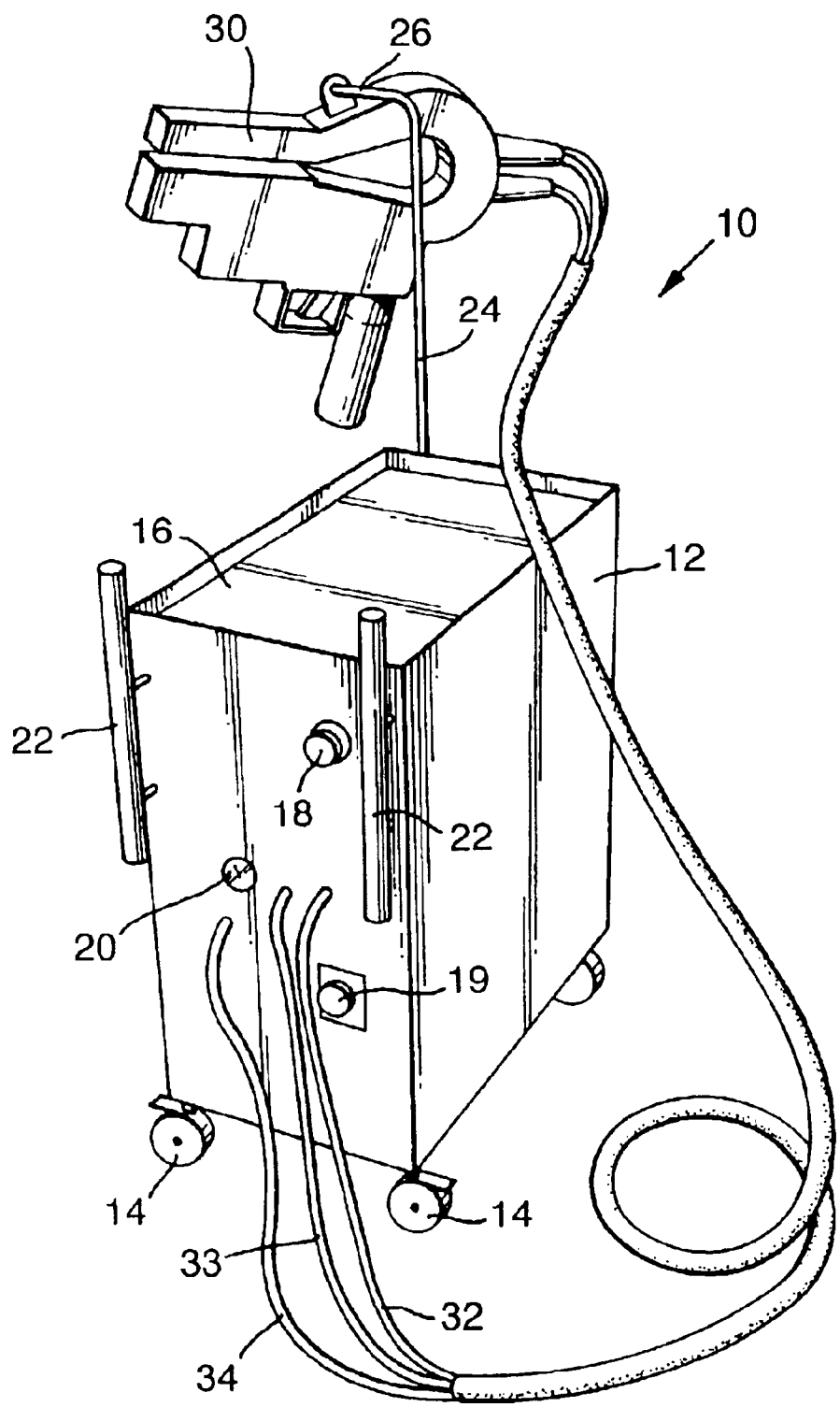
FIG. 1 shows a perspective view of a dielectric welding apparatus of the invention, incorporating a welding tool and a cabinet.

Referring to FIG. 1, a dielectric welding apparatus 10 includes a movable steel cabinet 12 on casters 14, the cabinet 12 enclosing a radio frequency generator, an air compressor and a compressed air reservoir. The top surface of the cabinet 12 is slightly recessed, and covered with a non-slip mat 16. The front face of the cabinet 12 carries control buttons 18 and 19 for the generator and compressor, and a gauge 20 to measure the air pressure. In addition there are two tubular handles 22 bolted to the front of the cabinet 12, and a support mast 24 attached to the back of the cabinet 12 extends above the cabinet 12, ending in a hook 26 to support a welding tool 30. The tool 30 is connected by a coaxial cable 32, an electric cable 33, and a pneumatic hose 34 (linked together for most of their length) to the cabinet 12.

Figure 2:
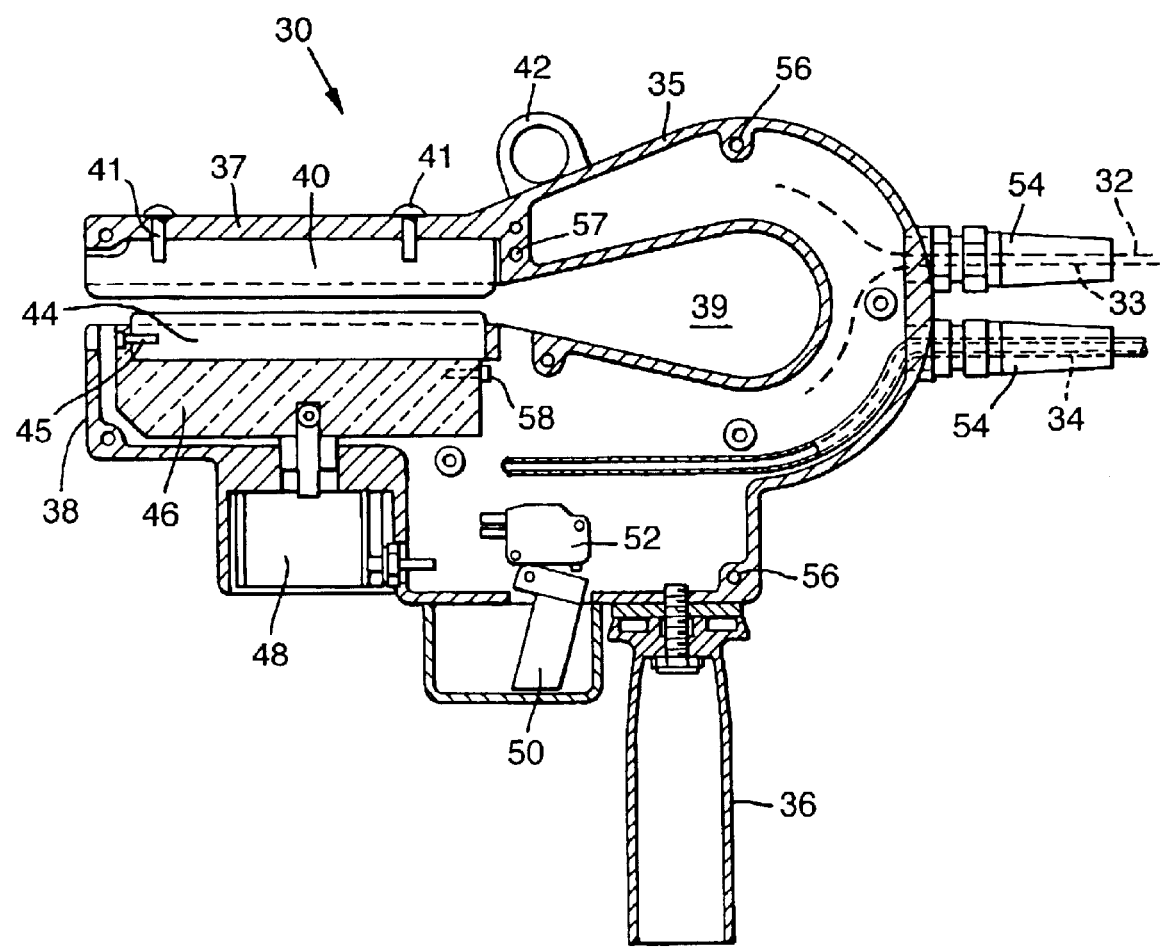
FIG. 2 shows a side view of the welding tool of FIG. 1, partly in section, and partly broken away.

Referring now to FIG. 2, this shows the welding tool 30 in longitudinal section. The tool 30 comprises a housing 35 with a tubular handle 36 attached on its underside. The housing 35 has a generally horseshoe shape at one end, from which upper and lower jaws extend parallel to each other, so that there is a slot between the upper half 37 and the lower half 38 of the housing 35, the slot being open at one end, and at the other end opening out into a wider aperture 39. The upper half 37 locates a welding electrode 40, of stainless-steel spray-coated with PFA insulator, which locates in a recess and is held rigidly by two screws 41. In this example the lower face of the electrode 40 is 10 mm thick (out of the plane of the figure) and 110 mm long. At the centre of the upper half 37 is an eyelet 42 to connect with the support hook 26. The lower half 38 locates a similar welding electrode 44 of stainless-steel spray coated with PFA insulator, 10 mm by 100 mm, and attached by a screw 45 into a support block 46 of electrically insulating material such as a ceramic, or delrin. The support block 46 is connected to a pneumatic cylinder 48. Next to the handle 36 is a trigger mechanism 50 which acts on a pneumatic switch 52 to control air supply to the cylinder 48 (the connecting tubes not being shown), and also on an electrical microswitch beside it (not shown) connected to the cable 33. Several screw holes 56 enable a cover plate (not shown) to be attached to the housing 35.

The pneumatic hose 34, and the electrical cable 33 and coaxial cable 32 (indicated by broken lines) are fed into the closed end of the housing 36 through couplings 54; the pneumatic hose 34 is connected to the switch 52 in the housing 36. Similarly the coaxial cable is connected within the housing 36 so that the upper electrode 40 is earthed (the earth connection being connected to a tag connected to screw hole 57 next to the electrode 40), while the lower electrode 44 is supplied with the radio frequency signal (this live connection being connected to a screw 58 at the back of the insulating support block 46, in contact with a metal foil (not shown) extending along the base of the slot in which the electrode 44 locates).

Figure 3:
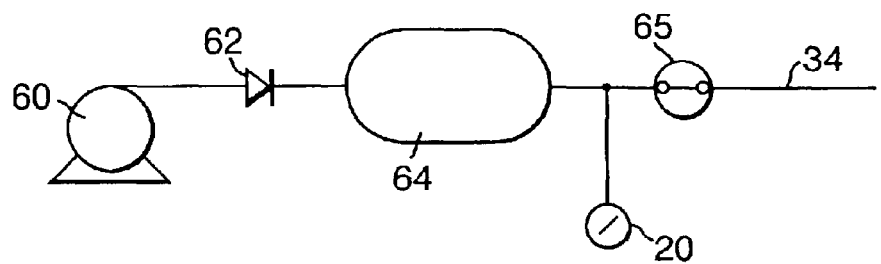
FIG. 3 shows diagrammatically the components within the cabinet of FIG. 1.
Figure 3:
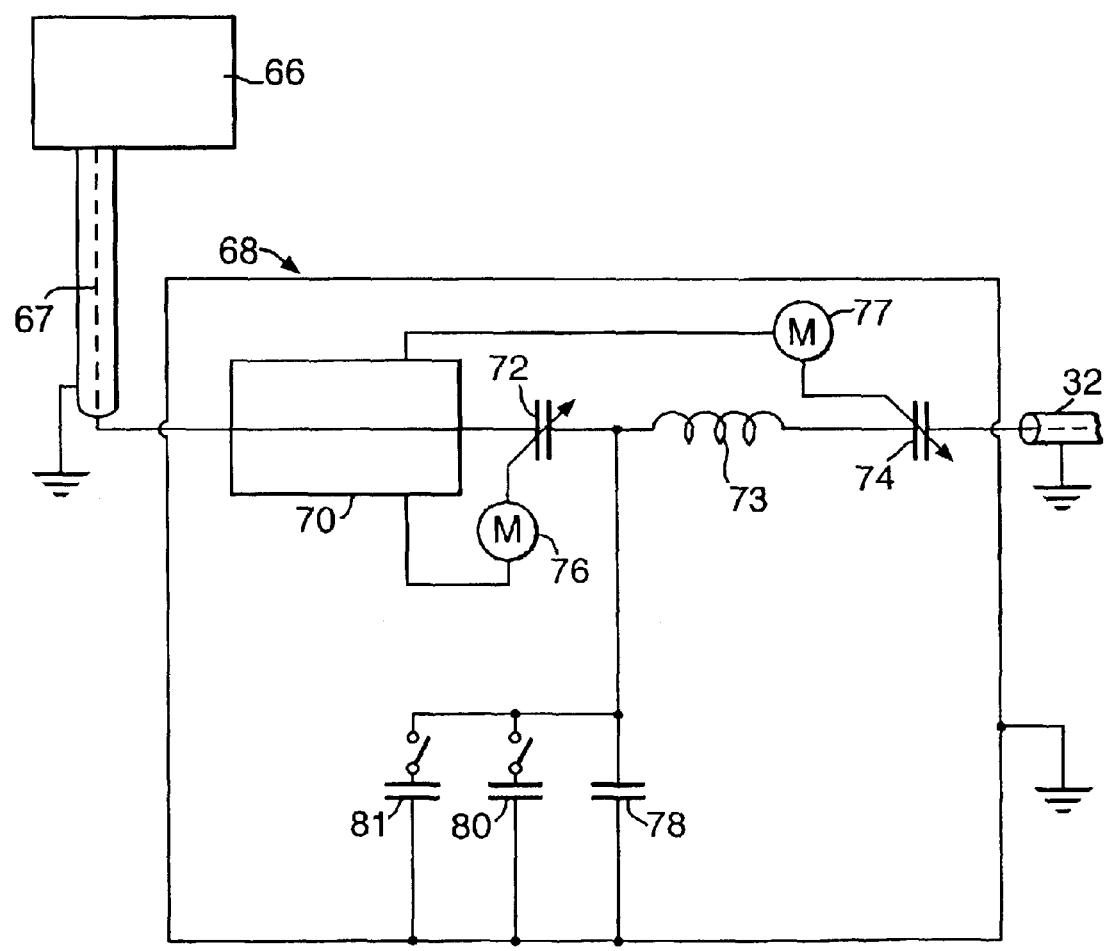

Referring down to FIG. 3, this shows diagrammatically the components within the cabinet 12. An air compressor 60 pumps air through a non-return valve 62 into a reservoir 64 that is connected to the pneumatic line 34 via direct acting 3/2 solenoid/spring valve 65. The compressor 60 is arranged to raise the air pressure to 0.57 MPa (85 psi); during use the pressure gradually falls, and when it reaches 0.50 MPa (75 psi) the compressor 60 is switched on again. If the pressure drops to less than 0.43 MPa (65 psi) this suggests catastrophic damage to the hose 34, and the compressor 60 is therefore switched off, and the valve 65 closes to prevent loss of air from the reservoir 64. A solid state radio frequency signal generator 66 supplies a radio frequency signal via a coaxial cable 67 to a matching network 68, from which the signal is supplied to the coaxial cable 32 (and so to the tool 30). The matching network 68 is shown in more detail. The signal passes through a monitoring circuit 70 (shown diagrammatically), a variable capacitor 72, an inductor 73, and a variable capacitor 74, and so to the cable 32. The monitoring circuit 70 monitors the radio frequency current and voltage, and adjusts the values of the variable capacitors 72 and 74 using servo-motors 76 and 77 so that the impedance presented to the generator 66 remains at a constant value such as 50 Ω. A capacitor 78 connects the junction between the capacitor 72 and the inductor 73 to earth potential, and by switching in other capacitors 80 and 81 the effective capacitance between this junction and earth can be adjusted. This has the effect of finely adjusting the radio frequency voltage applied between the live electrode 44 and the opposed, earthed electrode 40, and the RF current supplied. It thus controls the power that is actually supplied between the electrodes 40 and 44.

Thus in use, when an operator wishes to seal a sleeve of PVC tubing, he places an edge of the sleeve between the electrodes 40 and 44 of the tool 30, and pulls the trigger 50 so that the electrodes 40 and 44 are pneumatically squeezed together. After about half a second the electrical micro-switch, via the cable 33, activates the RF generator 66, so that the radio frequency signal (which may for example be at 27.12 MHz) is applied between the electrodes 40 and 44. As a result of dielectric losses the PVC melts, and the sheets are welded together. This welding process typically needs less than 5 seconds, and a timer may be arranged to automatically switch off the generator 66 after say 12 seconds. This process is repeated as the sleeve is moved step wise through the jaws, and with a wide sleeve it will be necessary to bundle part of the sleeve in the wider space 39.

The recess 16 on the top of the cabinet 12 provides a convenient place for the operator to rest the sleeve and its contents during this welding process.

It will be appreciated that a dielectric welding apparatus may differ from that described above while remaining within the scope of the invention.

We claim:

1. A dielectric welding apparatus for welding a plastic sleeve, the apparatus comprising a solid-state radio frequency generator, a matching network, and a welding tool, the tool comprising a frame with a handle, the frame defining a slot in which are opposed welding electrodes, and means for urging the electrodes together, the welding electrodes being connected via the matching network to the generator, wherein the matching network incorporates at least one variable capacitor and at least one servo-motor arranged to adjust said variable capacitor such that the impedance presented to the generator remains at a substantially constant value, and wherein the slot defined by the frame is a partly horseshoe-shaped slot, the slot being open at one end adjacent to which are the electrodes and communicating at the other end with a wider aperture.

2. An apparatus as claimed in claim 1 wherein the electrodes are coated with an electrically insulating material that is not dielectrically heated.

3. An apparatus as claimed in claim 1 wherein the electrodes are readily removable, so they can be replaced.

4. An apparatus as claimed in claim 1 wherein the radio frequency generator and the matching network are in a cabinet, and the welding tool is connected to the cabinet by a coaxial cable.

5. An apparatus as claimed in claim 4 wherein the cable is of a length that is a whole number of quarter wavelengths of electromagnetic radiation along the cable at the operating frequency.

6. An apparatus as claimed in claim 4 wherein both the coaxial cable and the means supplying power to urge the electrodes together are fed into the frame of the tool opposite the end at which the slot is open.

7. An apparatus as claimed in claim 1 wherein pneumatic means are provided for urging the electrodes together.

8. An apparatus as claimed in claim 1 wherein the welding tool incorporates a switch for activating both the means for urging the electrodes together, and the generator.

\* \* \* \* \*